(12) United States Patent
Yamaguchi

(10) Patent No.: US 12,313,645 B2
(45) Date of Patent: May 27, 2025

(54) MEASUREMENT CELL AND CENTRIFUGAL SEDIMENTATION-TYPE PARTICLE-SIZE DISTRIBUTION MEASURING DEVICE USING SAID MEASUREMENT CELL

(71) Applicant: HORIBA, LTD., Kyoto (JP)

(72) Inventor: Tetsuji Yamaguchi, Kyoto (JP)

(73) Assignee: HORIBA, LTD., Kyoto (JP)

( * ) Notice: Subject to any disclaimer, the term of this patent is extended or adjusted under 35 U.S.C. 154(b) by 259 days.

(21) Appl. No.: 17/997,067

(22) PCT Filed: Apr. 27, 2021

(86) PCT No.: PCT/JP2021/016741
§ 371 (c)(1),
(2) Date: Oct. 25, 2022

(87) PCT Pub. No.: WO2021/221044
PCT Pub. Date: Nov. 4, 2021

(65) Prior Publication Data
US 2023/0160801 A1    May 25, 2023

(30) Foreign Application Priority Data
Apr. 28, 2020  (JP) .................. 2020-079762

(51) Int. Cl.
*G01N 9/30* (2006.01)
*B01B 1/00* (2006.01)
(Continued)

(52) U.S. Cl.
CPC ............... *G01N 9/30* (2013.01); *B04B 1/08* (2013.01); *G01N 35/04* (2013.01); *G01N 35/1009* (2013.01); *G01N 2035/0405* (2013.01)

(58) Field of Classification Search
CPC ......... G01N 15/0205; G01N 2015/045; G01N 2035/0405; G01N 35/04; G01N 35/1009; G01N 9/30; B04B 1/08
See application file for complete search history.

(56) References Cited

U.S. PATENT DOCUMENTS 3,675,846 A * 7/1972 Drucker ............... B04B 5/0428
494/45
4,154,793 A 5/1979 Guigan
(Continued)

FOREIGN PATENT DOCUMENTS

EP   3859306 A1   8/2021
JP   61194329 A * 8/1986 ........... G01N 15/042
(Continued)

OTHER PUBLICATIONS

Extended European Search Report dated Mar. 22, 2024 issued in EP patent application No. 21795306.6.
(Continued)

*Primary Examiner* — Andre J Allen
(74) *Attorney, Agent, or Firm* — LUCAS & MERCANTI, LLP

(57) ABSTRACT

A measurement accuracy of a particle size distribution measuring device that performs a particle size distribution measurement in a line start mode is improved by a measurement cell used in a line start mode of a centrifugal sedimentation type particle size distribution measuring device that includes a cell main body and a cell cap. The cell main body has an opening provided on one end and stores therein a density gradient liquid WDGS. The cell cap closes the opening of the cell main body and has an internal passage R provided therein for holding a sample liquid WSS. When an application of a centrifugal force is received,
(Continued)

the sample liquid WSS is introduced from the internal passage R into the density gradient liquid WDGS.

13 Claims, 8 Drawing Sheets

(51) Int. Cl.
*B01B 1/08* (2006.01)
*B04B 1/08* (2006.01)
*G01N 35/04* (2006.01)
*G01N 35/10* (2006.01)

(56) References Cited

U.S. PATENT DOCUMENTS

| | | | |
|---|---|---|---|
| 4,226,531 | A | 10/1980 | Tiffany et al. |
| 4,410,318 | A * | 10/1983 | Bjork ................. B04B 7/06 494/10 |
| 5,786,898 | A * | 7/1998 | Fitzpatrick .......... G01N 15/042 356/426 |
| 10,596,570 | B2 * | 3/2020 | Maaskant ......... B01L 3/502738 |
| 2002/0127546 | A1 | 9/2002 | Anderson et al. |
| 2010/0222196 | A1 | 9/2010 | Ito et al. |
| 2014/0302483 | A1 * | 10/2014 | Kauling ................. B01D 21/00 435/2 |
| 2020/0009553 | A1 | 1/2020 | Roth |
| 2021/0283532 | A1 * | 9/2021 | Kulkarni .............. B01D 21/262 |
| 2021/0310925 | A1 * | 10/2021 | Yamaguchi ........... B04B 5/0414 |
| 2021/0381944 | A1 * | 12/2021 | Yamaguchi ........ G01N 21/0332 |

FOREIGN PATENT DOCUMENTS

| | | |
|---|---|---|
| JP | H065610 Y2 * | 8/1986 |
| JP | S62-111645 U | 7/1987 |
| JP | S62-115140 U | 7/1987 |
| JP | 2003-083990 A | 3/2003 |
| JP | 2005-043158 A | 2/2005 |

OTHER PUBLICATIONS

S.T. Fitzpatrick; Measurement of particle-size distribution by frequency-dependent centrifugal sedimentation: advantages and disadvantages, current situation, and future outlook; Polymer News, 1999, vol. 24, pp. 42-50 (Japanese only) with a concise English explanation of the relevance.

International Search Report for the corresponding patent application No. PCT/JP2021/016741 dated Jul. 6, 2021, with English translation.

* cited by examiner

PLAN VIEW

CROSS-SECTIONAL VIEW ACROSS LINE A-A

MEASUREMENT CELL AND CENTRIFUGAL SEDIMENTATION-TYPE PARTICLE-SIZE DISTRIBUTION MEASURING DEVICE USING SAID MEASUREMENT CELL

CROSS REFERENCE TO RELATED APPLICATION

This Application is a 371 of PCT/JP2021/016741 filed on Apr. 27, 2021, which, in turn, claims priority of Japanese Patent Application No. 2020-079762 filed on Apr. 28, 2020, and the above applications are incorporated herein by reference.

TECHNICAL FIELD

The present invention relates to a centrifugal sedimentation type particle size distribution measuring device, and particularly, relates to a measurement cell used in a line start mode of a centrifugal sedimentation type particle size distribution measuring device.

BACKGROUND ART

As a conventional centrifugal sedimentation type particle size distribution measuring device, there has been a device that uses a line start mode in which a sample suspension is supplied into a cell that contains a density gradient liquid, and particles in the sample suspension are centrifugally precipitated in the density gradient liquid, as disclosed in Non Patent Document 1.

Specifically, this particle size distribution measuring device uses a disk shaped, hollow cell. The cell storing therein a density gradient liquid is then rotated at a constant rotation speed, and a sample suspension is injected from the center of the rotation.

However, because the sample suspension is injected into the rotating cell from the outside, it is more likely for a variation to be introduced to the timing at which the sample suspension is injected. Furthermore, there are extensive variations in the time required for the sample to reach the density gradient liquid contained in the cell. Therefore, the resultant measurements suffer from some inaccuracy.

CITATION LIST

Non Patent Literature

Non Patent Literature 1: Stephen T. Fitzpatrick, "Measurement of particle size distribution by frequency dependent centrifugal sedimentation: advantages and disadvantages, current situation, and future outlook" [searched on May 30, 2018], Internet (URL: https://www.nihon-rufuto.com/myadmin/rufuto_catalog/wp-content/uploads/2017/06/CPS-Polymer-News.pdf)

SUMMARY OF INVENTION

Technical Problem

The present invention has been made to solve the problem described above, and a main object of the present invention is to improve measurement accuracy of a particle size distribution measuring device that measures a particle size distribution in a line start mode.

Solution to Problem

In other words, a measurement cell according to the present invention is a measurement cell used in a line start mode of a centrifugal sedimentation type particle size distribution measuring device, the measurement cell being characterized by including: a cell main body that has an opening on one end and that stores therein a density gradient liquid that is a solution having a density gradient; a cell cap that closes the opening of the cell main body and that is provided with an internal passage for holding a sample liquid, wherein the sample liquid is introduced into the density gradient liquid through the internal passage by receiving an application of a centrifugal force.

With such a configuration, because the internal passage provided inside the cell cap holds the sample liquid, and the sample liquid is introduced through the internal passage into the density gradient liquid by receiving an application of a centrifugal force, it is possible to establish the timing of the application of the centrifugal force to the measurement cell or the timing of rotating the measurement cell at a predetermined rotation speed, as the timing of the start of the measurement in the line start mode. Hence, it is possible to improve the measurement accuracy. In addition, because the sample liquid is held internal of the cell cap, it is possible to reduce the distance between the sample liquid and the density gradient liquid. Therefore, it is possible to reduce variations in the time required for the sample liquid to reach the density gradient liquid. With this, too, the measurement accuracy can be improved.

In a configuration in which the measurement cell is configured removably from the device main body, a thought is given to reduce the size of the measurement cell so as to make it easier to attach and to remove the measurement cell.

In such a case, the configuration in which the sample liquid is introduced from the outside could be a cause of a measurement error because the time required for the sample liquid to reach the measurement cell becomes extended. In addition, an introducing mechanism for introducing the sample liquid into the rotating measurement cell from the outside becomes complicated.

By contrast, according to the present invention, because the sample liquid is held internal of the cell cap of the measurement cell, it is possible to solve such a problem caused by making the measurement cell removable from the device main body, advantageously.

To allow the internal passage internal of the cell cap to hold the sample liquid with the cell cap attached to the cell main body, it is preferable to provide a sample inlet on one end of the internal passage and to provide a sample outlet to the other end, and for the sample inlet to be positioned external of the cell main body and for the sample outlet to be positioned internal of the cell main body when the cell cap is attached to the cell main body.

As a specific embodiment of the internal passage, it is preferable for the internal passage to include a liquid reservoir that holds the sample liquid introduced from the sample inlet, and a main passage that communicates with the liquid reservoir and that communicates with the sample outlet. When an application of a centrifugal force is received, the sample liquid stored in the liquid reservoir preferably flows out into the main passage, passes through the main passage, and is introduced into the density gradient liquid. The content volume of the liquid reservoir is determined based on the volume of the sample liquid.

By providing the liquid reservoir in the internal passage in the manner described above, the position where a predetermined amount of the sample liquid is held inside the internal passage becomes constant, so that it is possible to improve the reproducibility of particle size distribution measurements.

A configuration in which the main passage has a constant diameter has a risk of causing a problem that the sample liquid is introduced into the density gradient liquid as a lump, and the measurement of the particle size distribution fails to be carried out accurately due to a streaming phenomenon.

In order to solve this problem advantageously, it is preferable for the main passage to include a small diameter passage portion connected to the liquid reservoir and a large diameter passage portion provided downstream of the small diameter passage portion and communicating with the sample outlet.

With this configuration, the sample liquid from the small diameter passage portion spreads inside the large diameter passage portion, and is introduced into the density gradient liquid through the sample outlet. As a result, it is possible to prevent the streaming phenomenon, and to improve the measurement accuracy.

As a specific embodiment of the internal passage, it is preferable for the internal passage to also include an inlet passage portion communicating with the sample inlet and the liquid reservoir, for the inlet passage portion to be provided along a direction of a rotating shaft of the measurement cell, and for the main passage to be provided along the direction of the centrifugal force applied to the measurement cell. If the main passage is provided along the direction of the centrifugal force, it is possible to allow the sample liquid to flow through the main passage quickly.

In order to keep the sample liquid inside the liquid reservoir reliably before the measurement cell is rotated, and to allow the sample liquid to flow out of the liquid reservoir smoothly into the main passage when the measurement cell is rotated, it is preferable for the main passage to be connected to an upper part of the liquid reservoir, and for the liquid reservoir to have an inclined surface inclined upwards toward the main passage on the side connected with the main passage.

In order to facilitate machining of the liquid reservoir in the cell cap, it is preferable for the liquid reservoir to have a conical shape or a partially conical shape tapered toward the bottom.

With this configuration, the liquid reservoir may be formed in the cell cap by machining a hole into the cell cap using a drill.

When the sample outlet of the internal passage is in contact with the density gradient liquid, a surface tension acting near the sample outlet may prevent spreading (dispersion) of the sample liquid into the density gradient liquid.

In order to solve this problem advantageously, it is preferable for a space to be ensured between the cell cap and the density gradient liquid when the cell cap is attached to the cell main body.

With this configuration, the sample liquid introduced into the density gradient liquid is allowed to spread reliably, so that it becomes possible to improve the measurement accuracy.

Preferably, the cell main body and the cell cap are provided with a restricting mechanism for restricting the orientation in which the cell cap is attached to the cell main body.

With this configuration, it is possible to prevent the cell cap from being attached to the cell main body in an incorrect orientation.

Furthermore, a centrifugal sedimentation type particle size distribution measuring device according to the present invention is characterized by including the measurement cell described above, and a cell rotating mechanism that rotates the measurement cell in such a manner that a centrifugal force in a direction from a low density side toward a high density side of the density gradient is exerted on the measurement cell.

A possible configuration of the cell rotating mechanism includes a cell holder on which the cell is mounted. In this configuration, it is preferable for the measurement cell to be configured to be removable from the cell holder.

With such a configuration, only the component removed from the device main body is the cell, so that the removing operation can be simplified, and the subsequent cleaning operation can also be simplified. In addition, it is also possible to configure the cell to be removable from the device main body by using a configuration having a cell holder that is removable from the device main body.

The measurement cell and the cell holder are preferably provided with a restricting mechanism for restricting the orientation in which the measurement cell is attached to the cell holder.

With this configuration, it is possible to prevent the measurement cell from becoming attached to the cell holder in an incorrect orientation.

Furthermore, a measurement cell according to the present invention is a measurement cell used in a centrifugal sedimentation type particle size distribution measuring device, the measurement cell being characterized by including: a storage space where a dispersion medium is stored, and an internal passage communicating with the storage space and holding a sample liquid, and the sample liquid is introduced through the internal passage into the dispersion medium by receiving an application of a centrifugal force.

With such a measurement cell, the internal passage communicating with the storage space holds the sample liquid, and the sample liquid is introduced through the internal passage into the dispersion medium by receiving an application of a centrifugal force. Therefore, it is possible to reduce the distance between the sample liquid and the dispersion medium, so that it becomes possible to suppress variations in the time required for the sample liquid to reach the dispersion medium. With this, too, the measurement accuracy can be improved.

<Advantageous Effects of Invention>

According to the present invention described above, it is possible to improve the measurement accuracy of a particle size distribution measuring device that performs a particle size distribution measurement in a line start mode.

Figure 1:
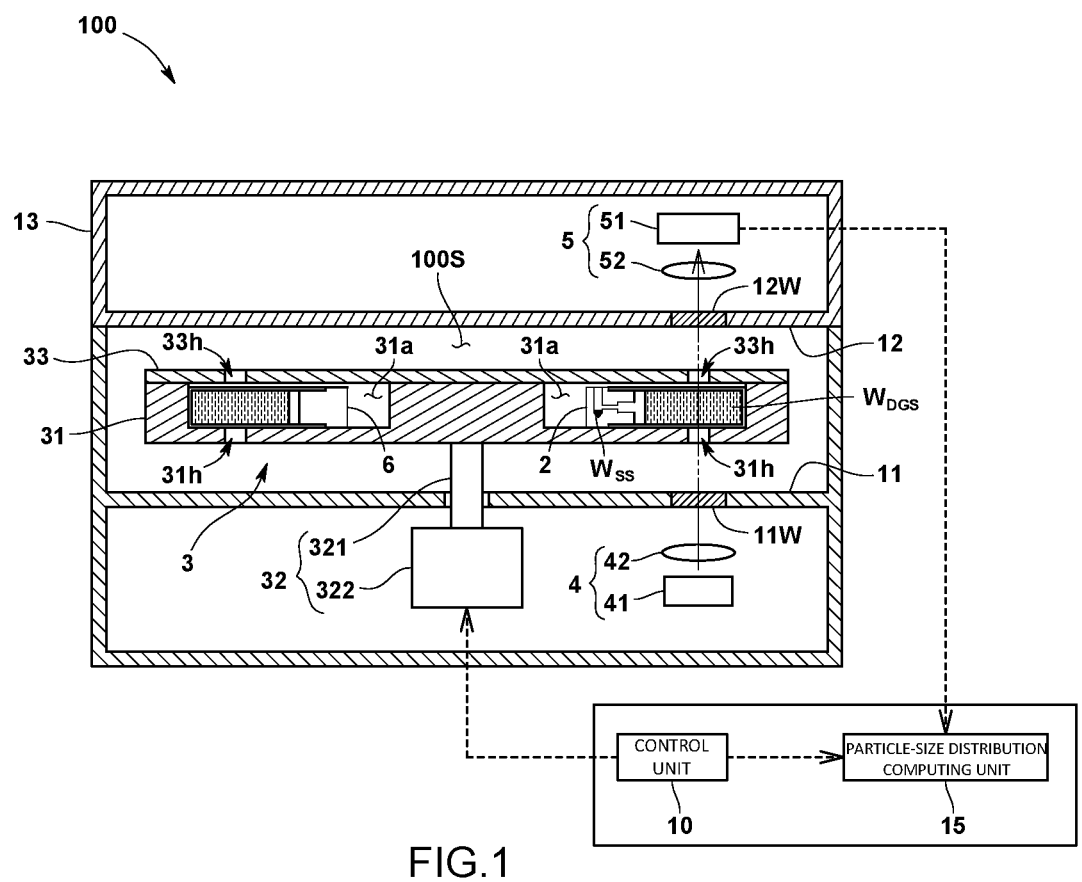
FIG. 1 is a diagram schematically illustrating a configuration of a centrifugal sedimentation type particle size distribution measuring device according to an embodiment of the present invention.

REFERENCE SIGNS LIST 100 centrifugal sedimentation type particle size distribution measuring device
2 measurement cell
3 cell rotating mechanism
31 cell holder
$W_{SS}$ sample liquid
$W_{DGS}$ density gradient liquid
21H opening
21 cell main body
R internal passage
22 cell cap
2A sample inlet
2B sample outlet
R1 liquid reservoir
R2 main passage
R2a small diameter passage portion
R2b large diameter passage portion
R3 inlet passage portion
R1x inclined surface
S1 space

DESCRIPTION OF EMBODIMENTS

A centrifugal sedimentation type particle size distribution measuring device according to an embodiment of the present invention will now be explained with reference to some drawings.

<1. Device Configuration of Particle Size Distribution Measuring Device>

A centrifugal sedimentation type particle size distribution measuring device 100 according to the present embodiment performs a particle size distribution measurement in a line start mode, and includes, as illustrated in FIG. 1, a measurement cell 2 where a density gradient liquid $W_{DGS}$ and a sample liquid $W_{SS}$ are stored, a cell rotating mechanism 3 that rotates the measurement cell 2, and a light emitting unit 4 and a light detecting unit 5 that are provided facing each other across a section where the measurement cell 2 being rotated by the cell rotating mechanism 3 passes. The sample liquid $W_{SS}$ according to the present embodiment is a sample suspension in which particles are dispersed.

The measurement cell 2 is a hollow rectangular cell having a substantially cuboid shape, for example. A density gradient liquid $W_{DGS}$ that is a solution with a density gradient is stored in the measurement cell 2. The density gradient liquid $W_{DGS}$ is formed using, for example, a plurality of sucrose solutions having different concentrations, and is stored as a plurality of layers in such a manner that the density gradually increases toward the bottom of the measurement cell 2. In the present embodiment, a reference cell 6 is also provided, and water is stored in the reference cell 6.

The cell rotating mechanism 3 is configured to rotate the measurement cell 2 in such a manner that a centrifugal force in a direction from a low density side toward a high density side of the density gradient is exerted on the measurement cell 2.

Specifically, the cell rotating mechanism 3 includes a cell holder 31 to which the measurement cell 2 and the reference cell 6 are removably attached, and a rotating unit 32 that rotates the cell holder 31.

Figure 2:
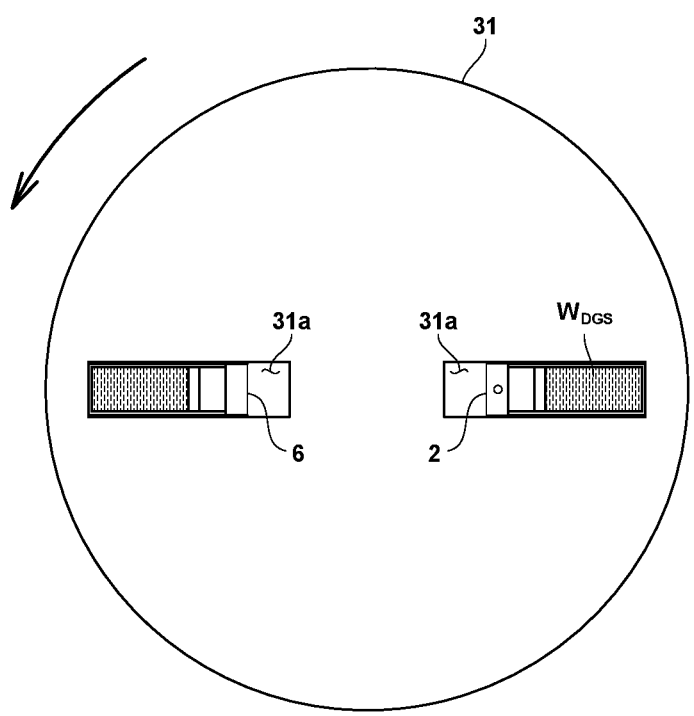
FIG. 2 is a plan view of a cell holder having a cell according to the embodiment attached.

As illustrated in FIG. 2, the cell holder 31 has a disk like shape, for example, and the measurement cell 2 and the reference cell 6 are attached facing each other with a rotational center of the cell holder 31 therebetween. At this time, the measurement cell 2 is attached in such a manner that the direction of the density gradient extends along the radial direction of the cell holder 31. In addition, the cell holder 31 has attaching recesses 31a each having a shape corresponding to the shape of a cell, and the cells 2 and 6 are attached by being fitted into the attaching recesses 31a, respectively. Furthermore, guiding mechanisms (not illustrated) are provided between the measurement cell 2 and the reference cell 6, and the respective attaching recesses 31a. Each of the guiding mechanisms includes a guide rail provided to one of the attaching recess 31a and the cells 2 and 6, and a guide groove provided to the other. The guide rail or the guide groove provided to the cell 2, 6 may be provided integrally with the cell 2, 6, or may be provided to a member attached to the cell 2, 6. The guiding mechanism also functions as a restricting mechanism that restricts the orientation in which the measurement cell 2 or the reference cell 6 is attached to the cell holder 31.

The measurement cell 2 and the reference cell 6 are configured to be removable from the cell holder 31. By configuring the cells 2 and 6 to be removable from the cell holder 31, the cells 2 and 6 are configured to be removable from the device main body. An opening and closing lid 13 is opened when the cells 2 and 6 are to be removed from the device main body.

A cover body 33 for preventing the measurement cell 2 and the reference cell 6 from being unexpectedly detached during the rotation is provided on the top surface of the cell holder 31 (see FIG. 1).

As an orientation which the measurement cell 2 is attached to the cell holder 31, the measurement cell 2 is attached in such a manner that the high density side is on the radially outer side. As a result, when the cell holder 31 is rotated, a centrifugal force in a direction from a low density side toward a high density side of the density gradient is exerted on the measurement cell 2.

As illustrated in FIG. 1, the rotating unit 32 includes a rotating shaft 321 that is connected to the center of the bottom surface of the cell holder 31, and a motor 322 that rotates the rotating shaft 321. The rotation speed of the motor 322 is controlled by the control unit 10. Note that the rotating shaft 321 may be provided integrally with or separately from the cell holder 31. Furthermore, the rotating shaft 321 may be made from one member or may be made by connecting a plurality of members.

The cell holder 31 is housed in a housing space 100S provided inside the particle size distribution measuring device 100. The rotating shaft 321 of the rotating unit 32 is passed through a bottom wall 11 by which the housing space 100S is formed. A top wall 12 by which the housing space 100S is formed is provided as an opening and closing lid 13 that is opened and closed when the measurement cell 2 is to be attached and removed.

As illustrated in FIG. 1, the light emitting unit 4 is provided below a section across which the rotating cells 2 and 6 pass (below the cell holder 31). The light emitting unit 4 according to the present embodiment is provided under the bottom wall 11 of the housing space 100S, and emits light into the cells 2 and 6 through a light transmission window 11W provided to the bottom wall 11. Specifically, the light emitting unit 4 includes a light source 41 such as an LED, and a condenser lens 42 that condenses the light emitted from the light source 41. The light emitted from the light emitting unit 4 passes through a light passage hole 31h provided to the cell holder 31, and the measurement cell 2 or the reference cell 6 is irradiated therewith.

As illustrated in FIG. 1, the light detecting unit 5 is provided above the section across which rotating cells 2 and 6 pass (above the cell holder 31). The light detecting unit 5 according to the present embodiment is provided above the top wall 12 of the housing space 100S, and detects light transmitted through the cells 2 and 6, via a light transmission window 12W provided on the top wall 12. Specifically, the light detecting unit 5 includes a light detector 51 and a condenser lens 52 that condenses the light to be detected by the light detector 51. The light to be detected by the light detecting unit 5 passes through the cells 2 and 6, passes through a light passage hole 33h provided to the cover body 33, and is condensed by the condenser lens 52.

A light intensity signal obtained by the light detector 51 is acquired by the particle size distribution computing unit 15, and the particle size distribution computing unit 15 calculates particle size distribution data. The particle size distribution computing unit calculates particle size distribution data using the light intensity signals and a rotation start signal acquired from the control unit 10. The particle size distribution data is displayed on a display by a display unit, not illustrated.

<2. Specific Configuration of Measurement Cell 2>

As described above, the measurement cell 2 according to the present embodiment is used in the line start mode of the centrifugal sedimentation type particle size distribution measuring device 100.

Figure 3:
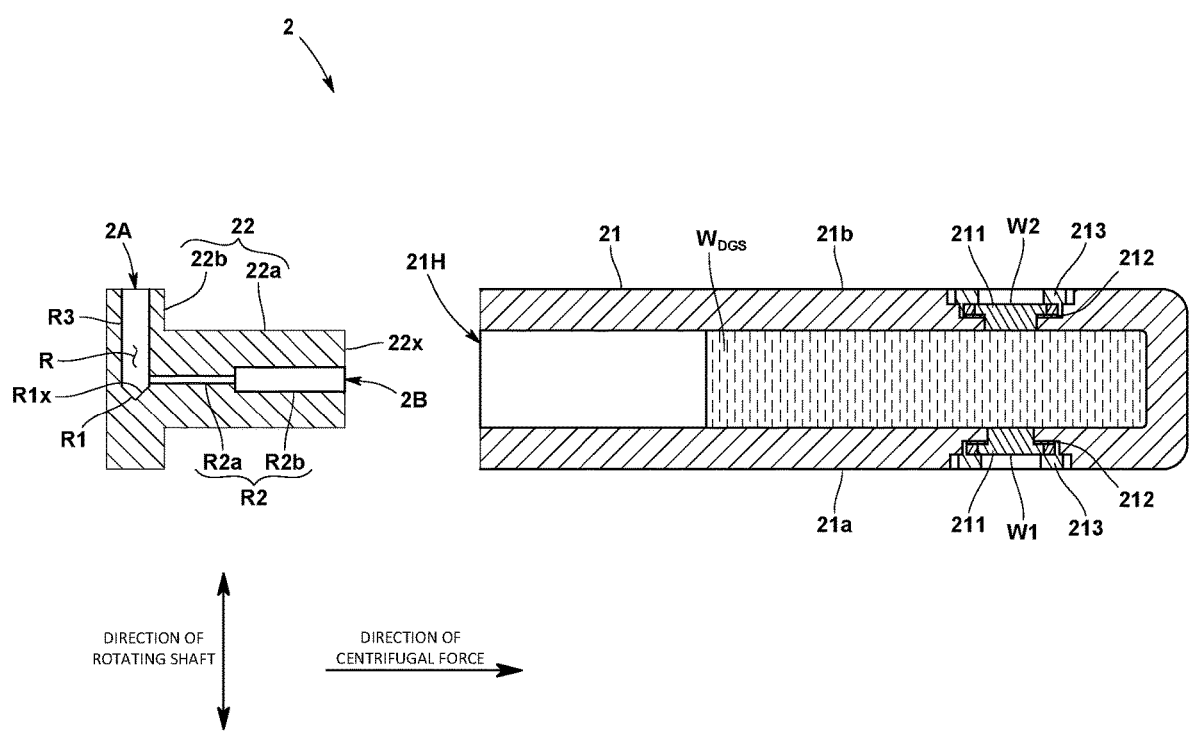
FIG. 3 is a cross sectional view schematically illustrating a configuration in which a cell cap is removed from a cell main body of a measurement cell according to the embodiment.
Figure 4:
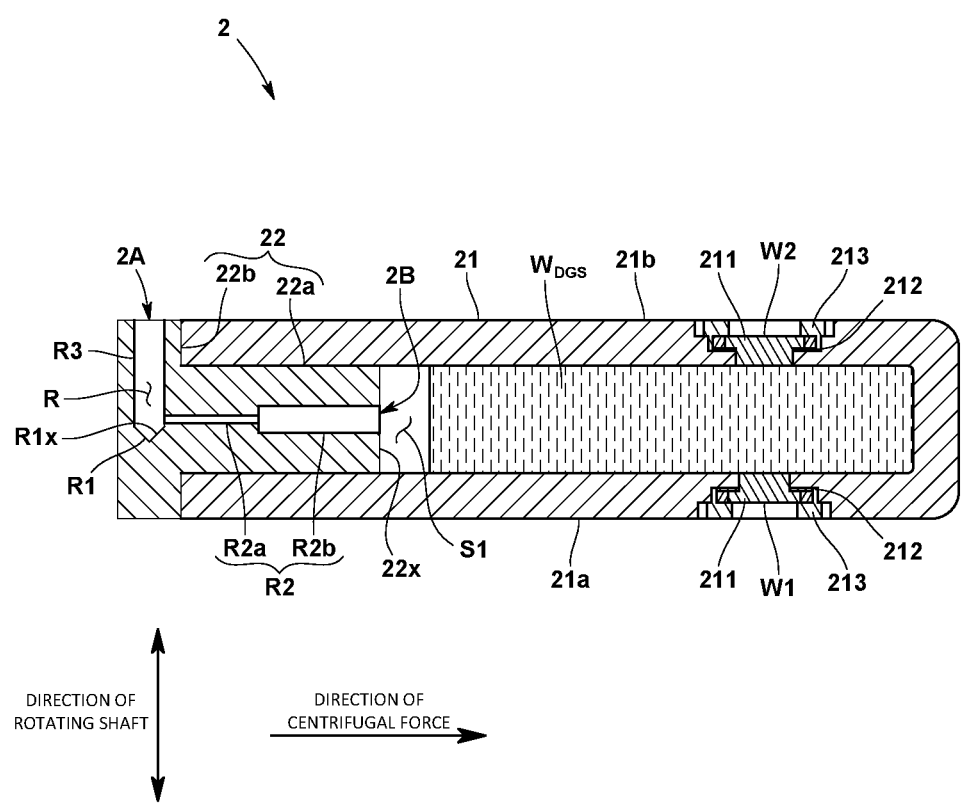
FIG. 4 is a cross sectional view schematically illustrating a configuration in which the cell cap is attached to the cell main body of the measurement cell according to the embodiment.

Specifically, as illustrated in FIGS. 3 and 4, the measurement cell 2 includes a cell main body 21 that has an opening 21H provided on one end and that stores therein the density gradient liquid $W_{DGS}$, and a cell cap 22 that closes the opening 21H of the cell main body 21 and internal of which is provided with an internal passage R for holding the sample liquid $W_{SS}$. The measurement cell 2 is configured in such a manner that, when an application of a centrifugal force is received, the sample liquid $W_{SS}$ is introduced into the density gradient liquid $W_{DGS}$ through the internal passage R.

The cell main body 21 is made of a metal such as aluminum, for example, and is provided with the light transmission windows W1 and W2 for transmitting light, on opposing walls 21a and 21b facing each other, respectively. The opposing walls 21a and 21b face each other in a direction orthogonal to the direction of the centrifugal force. By using a metal as the material of the cell main body 21, it is possible to ensure that the cell main body has a strength to withstand the centrifugal force, and an excellent chemical resistance.

The light transmission windows W1 and W2 are configured by installing glass window members 211 in through holes that are provided in the opposing walls 21a and 21b of the cell main body 21, respectively. Because the window members 211 are made of glass, the window members 211 have excellent chemical resistance. The window members 211 are liquid tightly fixed to through holes, respectively, that are provided in the opposing walls 21a and 21b, respectively, each with a seal member 212 and a fixing member 213 therebetween. At this time, among the light transmission windows W1 and W2, the size of the light transmission window W2 that is the outgoing side of the light is larger than the light transmission window W1 on the incident side of the light. In this manner, it is ensured that, even when the cell rotating mechanism 3 experiences rotational deviations (deviations of the rotating shaft), the light comes out of the light transmission window W2 on the outgoing side of the light.

Figure 5:
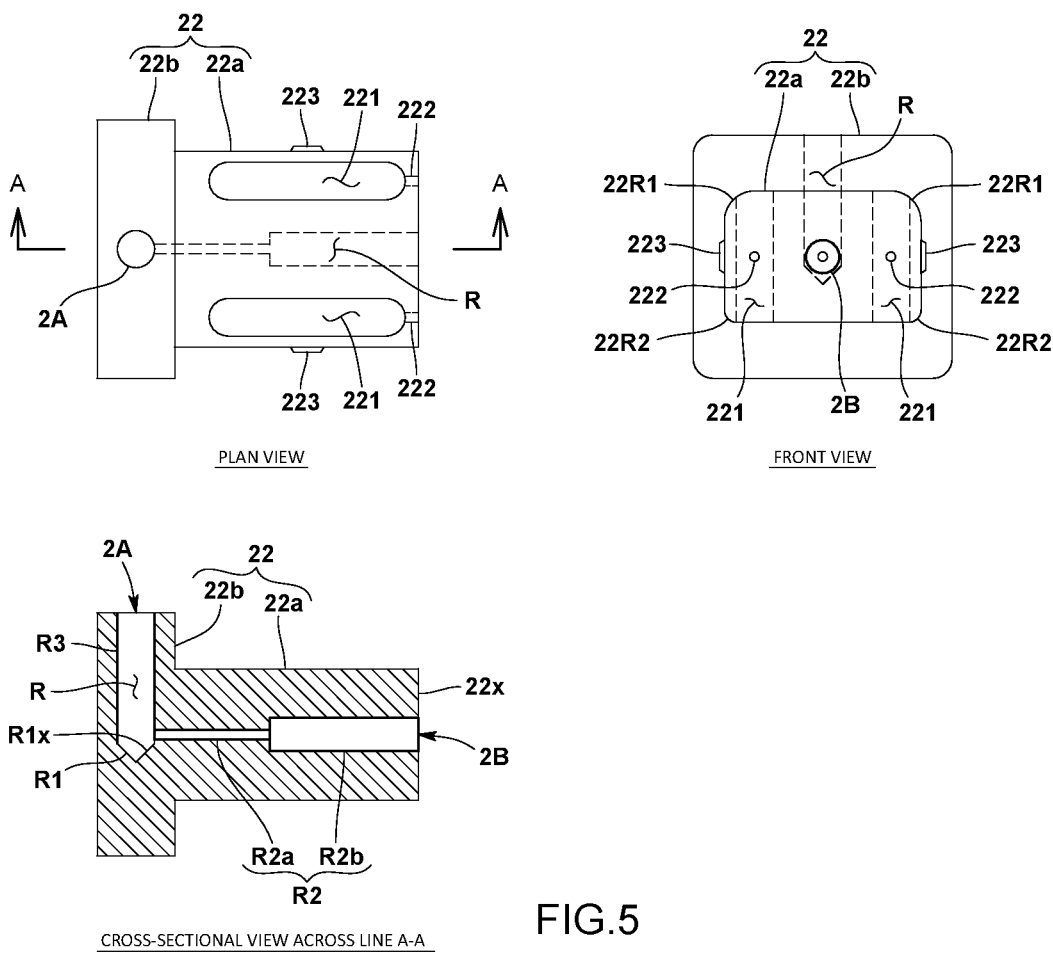
FIG. 5 is a plan view, a front view, and a cross sectional view taken along the line A-A, illustrating a configuration of the cell cap according to the embodiment.

The cell cap 22 is made of a resin, for example, and is inserted into the opening 21H of the cell main body 21 and closes the opening 21H, as illustrated in FIGS. 3, 4, and 5. At this time, the cell cap 22 has an inserted portion 22a to be inserted into the opening 21H of the cell main body 21, and a rear end 22b that is positioned outside the cell main body 21.

A sample inlet 2A is provide on one end of the internal passage R provided to the cell cap 22, and a sample outlet 2B is provided on the other end. With the cell cap 22 attached to the cell main body 21, the sample inlet 2A is positioned external of the cell main body 21, and the sample outlet 2B is positioned internal of the cell main body 21. Specifically, the sample inlet 2A is provided on the top surface of the rear end 22b, and the sample outlet 2B is provided on a tip surface 22x of the inserted portion 22a. With this configuration, when the cell cap 22 is attached to the cell main body 21, the sample liquid $W_{SS}$ can be introduced into the internal passage R from the sample inlet 2A.

The internal passage R includes a liquid reservoir R1 for holding the sample liquid $W_{SS}$ introduced from the sample inlet 2A, and a main passage R2 communicating with the liquid reservoir R1 and communicating with the sample outlet 2B. When the centrifugal force is applied, the sample liquid $W_{SS}$ held inside the liquid reservoir R1 flows into the main passage R2, passes through the main passage R2, and is introduced into the density gradient liquid $W_{DGS}$.

At this time, the internal passage R also includes an inlet passage portion R3 communicating with the sample inlet 2A and the liquid reservoir R1. The inlet passage portion R3 is provided along the direction of the rotating shaft (in FIGS. 3 and 4, the up and down direction on the paper surface) of the measurement cell 2, and the main passage R2 is provided along the direction of the centrifugal force (the radial direction of the rotation, in FIGS. 3 and 4, the left to right direction on the paper surface) applied to the measurement cell 2. In other words, in the present embodiment, the inlet passage portion R3 and the main passage R2 are orthogonal to each other. The inlet passage portion R3 may be provided in a manner inclined with respect to the main passage R2.

The main passage R2 includes a small diameter passage portion R2a that is an upstream passage communicating with the liquid reservoir R2, and a large diameter passage portion R2b that is provided downstream of the small diameter passage portion R2a and that communicates with the sample outlet 2B. The small diameter passage portion R2a is a linear passage having a constant diameter, and the large diameter passage portion R2b is a linear passage having a constant diameter that is larger than the diameter of the small diameter passage portion R2a. The small diameter passage portion R2a and the large diameter passage portion R2b are coaxially provided.

The liquid reservoir R1 is provided to a pointed end (bottom end) of the inlet passage portion R3, and can temporarily store therein a predetermined amount (for example, 10 μL) of the sample liquid $W_{SS}$. At this time, by being connected to the inlet passage portion R3, the liquid reservoir R1 is configured as a space having an opening on the top. The liquid reservoir R1 stores therein substantially the entire sample liquid $W_{SS}$ to be introduced into the inlet passage portion R3 via the sample inlet 2A.

The positional relationship between the liquid reservoir R1 and the main passage R2 is configured in such a manner that the main passage R2 is connected to an upper part of the liquid reservoir R1. In other words, the main passage R2 communicates with the liquid reservoir R1 by being connected to the inlet passage portion R3.

At this time, the liquid reservoir R1 has an inclined surface R1x inclined upwards toward the main passage R2, on the side where the liquid reservoir R1 is connected to the main passage R2 (radially outer side). This configuration allows the sample liquid $W_{SS}$ stored in the liquid reservoir R1 to flow into the main passage R2 smoothly when an application of a centrifugal force is received. The liquid reservoir R1 according to the present embodiment has a conical shape or a partially conical shape that is tapered toward the bottom, thereby forming the inclined surface R1x.

Furthermore, in the present embodiment, when the cell cap 22 is attached to the cell main body 21, a space S1 is ensured between the cell cap 22 and the density gradient liquid $W_{DGS}$. The space S1 is ensured between the tip surface 22x of the cell cap 22 and the liquid surface of the density gradient liquid $W_{DGS}$ stored in the cell main body 21. At this time, the surface tension of the density gradient liquid $W_{DGS}$ stored inside the cell main body 21 keeps the shape of the surface, and even when the measurement cell 2 is tilted sideways, the density gradient liquid $W_{DGS}$ does not flow toward the side near the cell cap 22, and the space S1 between the tip surface 22x of the cell cap 22 and the liquid surface of the density gradient liquid $W_{DGS}$ is maintained.

In addition, hollows 221 are provided to the cell cap 22, as illustrated in FIG. 5, to reduce the weight. At this time, the hollows 221 are provided on both the left and the right sides of the inserted portion 22a of the cell cap 22, with the internal passage R provided at the center interposed therebetween. The hollows 221 according to the present embodiment are through holes. Each of the hollows 221 is a long hole provided across a predetermined range in the direction in which the cell cap 22 is attached.

Furthermore, the cell cap 22 is provided with air vents 222 for letting the air out when the cell cap 22 is attached to the cell main body 21. The air vents 222 are communicating passages each having an opening on the tip surface 22x of the cell cap 22 and communicating with the through hole that is the corresponding hollow 221. When the cell cap 22 is attached to the cell main body 21, the air inside the cell main body 21 passes through the air vents 222 and discharged from the through holes that are the hollows 221.

Furthermore, on both of the left and the right side surfaces of the cell cap 22, protrusions 223 are provided to ensure adhesion with the left and right inner side surfaces of the cell main body 21, respectively, when the cell cap 22 is attached to the cell main body 21. At this time, because the hollows 221 are provided on the inner sides of the side surfaces where the protrusions 223 are provided, respectively, the side surfaces provided with the respective protrusions 223 become elastically deformed inwards, and the protrusions 223 are elastically brought into close contact with the left and right inner side surfaces of the cell main body 21, respectively.

In addition, the cell main body 21 and the cell cap 22 are provided with a restricting mechanism that restricts the orientation in which the cell cap 22 is attached to the cell main body 21. Specifically, the restricting mechanism is achieved by the shape of the opening of the cell main body 21 and the shape of the inserted portion 22a inserted into the opening 21H of the cell cap 22. For example, at least one of the four rounded portions of the opening 21H of the cell main body 21 has a different shape, and four round portions 22R1 and 22R2 of the inserted portion 22a of the cell cap portion 22 are provided with the shapes corresponding thereto, respectively (see the front view of FIG. 5). As a result, it is possible to make sure that orientation in which the cell cap 22 is inserted into the cell main body 21 is restricted to only one.

A line start mode using the measurement cell 2 will now be explained briefly.

Figure 6:
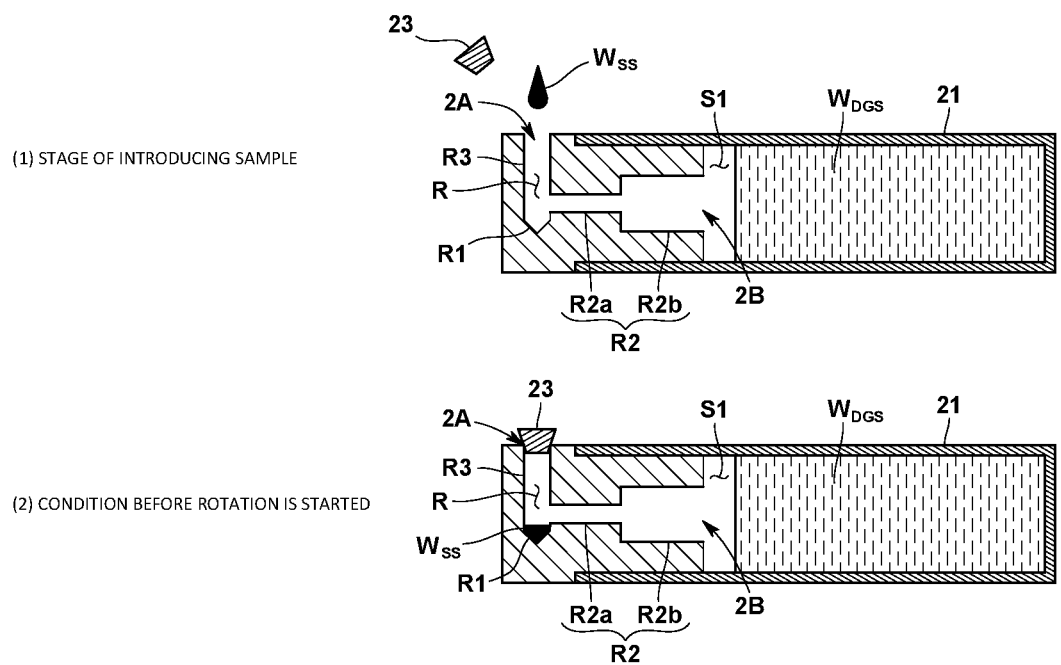
FIG. 6 is a cross sectional view illustrating (1) a stage of sample preparation and (2) a configuration before rotation is started, in the embodiment.

To introduce the sample liquid $W_{SS}$ into the measurement cell 2, as illustrated in FIG. 6 (1), the sample liquid $W_{SS}$ is introduced from the sample inlet 2A, with the cell cap 22 attached to the cell main body 21. After the sample liquid is introduced, the sample liquid $W_{SS}$ passes through the inlet passage portion R3, and is held in the liquid reservoir R1 (see FIG. 6 (2)).

After the sample liquid is introduced, the sample inlet 2A may be closed with a lid body 23. By closing the sample inlet 2A with the lid body 23, it is possible to prevent evaporation of the sample liquid $W_{SS}$ and prevent leakage of the density gradient liquid $W_{DGS}$ into the internal passage R due to an air pocket formed inside the internal passage R.

Figure 7:
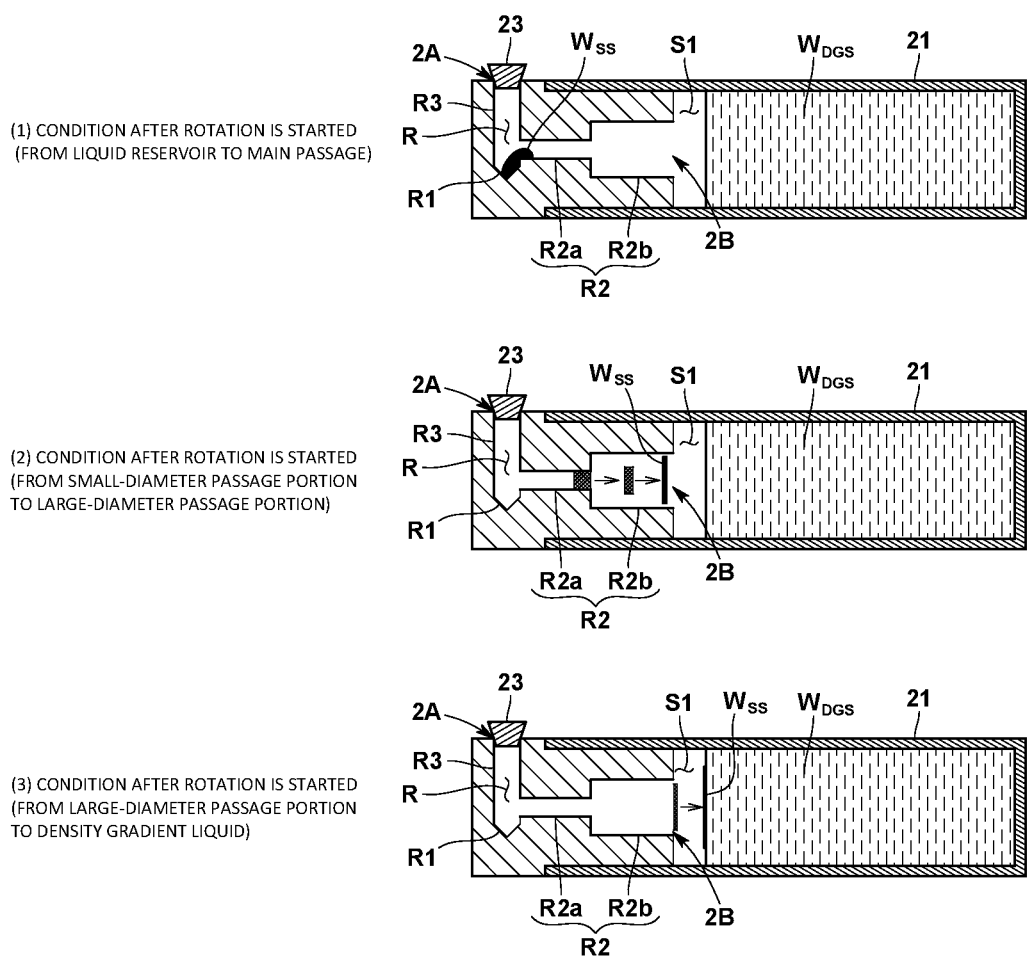
FIG. 7 is a cross sectional view illustrating a process in which a sample liquid reaches a density gradient liquid after the rotation is started, in the embodiment.

When the measurement cell 2 is then rotated, the sample liquid $W_{SS}$ receives the centrifugal force and moves from the liquid reservoir R1 toward the small diameter passage portion R2a of the main passage R2, as illustrated in FIG. 7 (1). The particle size distribution measurement is then started at the same time as when the measurement cell 2 starts being rotated. In the present embodiment, the timing at which rotation of the measurement cell 2 is started is used as the timing at which the particle size distribution measurement is started. At this time, because the sample liquid $W_{SS}$ passes through the inlet passage portion R3 and is held in the liquid reservoir R1, the sample liquid $W_{SS}$ is positioned away from the rotational center of the measurement cell 2, and the sample liquid is more likely to be subjected to the centrifugal force generated by the rotation. Therefore, the sample liquid flows into the main passage R2 more smoothly. In a device configuration in which the sample liquid is introduced from the rotational center, the centrifugal force is hardly received immediately after the sample liquid is introduced, and variations prior to the sample liquid being introduced into the density gradient liquid become increased.

The sample liquid $W_{SS}$ then flows through the small diameter passage portion R2a to the large diameter passage portion R2b, spreads inside the large diameter passage portion R2b, as illustrated in FIG. 7 (2), and is introduced into the density gradient liquid $W_{DGS}$ via the sample outlet 2B, as illustrated in FIG. 7 (3). As a result, it is possible to prevent a streaming phenomenon. Furthermore, because the space S1 is ensured between the sample outlet 2B and the density gradient liquid $W_{DGS}$, it is possible to ensure that the sample liquid $W_{SS}$ having been introduced spreads across the density gradient liquid $W_{DGS}$ reliably. Hence, it is possible to improve the measurement accuracy.

<Advantageous Effects Achieved by Present Embodiment>

With the centrifugal sedimentation type particle size distribution measuring device 100 according to the present embodiment, the sample liquid $W_{SS}$ is held inside the internal passage R provided inside the cell cap 22, and when a centrifugal force is applied thereto, the sample liquid $W_{SS}$ is introduced through the internal passage R into the density gradient liquid $W_{DGS}$. Therefore, it is possible to establish the timing of the application of the centrifugal force to the measurement cell 2 or the timing of rotating the measurement cell 2 at a predetermined rotation speed as the timing of the start of the measurement in the line start mode. Hence, the measurement accuracy can be improved. Furthermore, because the sample liquid $W_{SS}$ is held inside of the cell cap 22, it is possible to reduce the distance between the sample liquid $W_{SS}$ and the density gradient liquid $W_{DGS}$, so that it is possible to reduce variations in the time required for the sample liquid $W_{SS}$ to reach the density gradient liquid $W_{DGS}$. With this, too, the measurement accuracy can be improved. Furthermore, because the sample liquid $W_{SS}$ is held in the measurement cell 2 that is configured to be removable from the device main body, an introducing mechanism for introducing the sample liquid $W_{SS}$ into the rotating measurement cell 2 from the external can be rendered unnecessary.

In the present embodiment, because the liquid reservoir R1 is provided to the internal passage R, a predetermined amount of the sample liquid $W_{SS}$ can be held at a constant position in the internal passage R, so that the reproducibility of the particle size distribution measurement can be improved.

Furthermore, because the main passage R2 is connected to the upper part of the liquid reservoir R1, and the liquid reservoir R1 has the inclined surface R1$x$ on the side connected with the main passage R2, the inclined surface being inclined upwards toward the main passage R2, it is possible to hold the sample liquid $W_{SS}$ reliably inside the liquid reservoir R1 before the measurement cell 2 is rotated, and to allow the sample liquid $W_{SS}$ to flow out of the liquid reservoir R1 smoothly into the main passage R2 while the measurement cell 2 is being rotated.

At this time, because the liquid reservoir R1 has a conical shape or a partial conical shape tapered toward the bottom, the liquid reservoir R1 can be easily machined into the cell cap 22.

Furthermore, because, when the cell cap 22 is attached to the cell main body 21, the space S1 is ensured between the cell cap 22 and the density gradient liquid $W_{DGS}$, it is possible to alleviate a streaming phenomenon caused by the contact of the density gradient liquid $W_{DGS}$ with the cell cap 22, to spread the sample liquid $W_{SS}$ into the density gradient liquid $W_{DGS}$ reliably, and to improve the measurement accuracy.

<Other Embodiments>

Note that the present invention is not limited to the embodiment described above.

For example, in the above embodiment, the particle size distribution is measured in the line start mode, but according to the present invention, it is possible to configure so as to enable the particle size distribution measurement not only in the line start mode but also in a uniform sedimentation mode. In this mode, sample dispersion stored in the measurement cell 2 contains particles dispersed across a medium. In the uniform sedimentation mode, too, the timing of rotating the measurement cell containing the sample dispersion is used as the timing of the start of the measurement.

In such an example, as a configuration of the measurement cell, the measurement cell includes a storage space storing therein the dispersion medium, and an internal passage communicating with the storage space and holding the sample liquid, and the sample liquid is introduced through the internal passage into the dispersion medium by receiving an application of a centrifugal force. Specifically, it is possible to configure the measurement cell to include a cell main body that has an opening on one end and that stores therein a dispersion medium, and a cell cap by which the opening of the cell main body is closed and that is provided with an internal passage for holding a sample liquid, and the sample liquid is introduced through the internal passage into the dispersion medium by receiving an application of a centrifugal force. The cell main body and the cell cap may have the same configuration as those according to the embodiment described above. With such a measurement cell, the internal passage communicating with the storage space holds the sample liquid, and the sample liquid is introduced through the internal passage into the dispersion medium by receiving an application of a centrifugal force. Therefore, it is possible to reduce the distance between the sample liquid and the dispersion medium, so that it becomes possible to suppress variations in the time required for the sample liquid to reach the dispersion medium. With this, too, the measurement accuracy can be improved.

Furthermore, the liquid reservoir R1 according to above embodiment described above has a conical shape or a partial conical shape tapered toward the bottom, but may have various other shapes. For example, the liquid reservoir R1 may have a partial spherical shape, or a polygonal columnar shape, for example. Even with such configurations, it is desirable to have the inclined surface R1$x$ having an upward gradient toward the main passage R2.

Furthermore, the measurement cell according to the embodiment described above is a rectangular cell having a rectangular cuboidal outer shape, but may also have any other shape.

Figure 8:
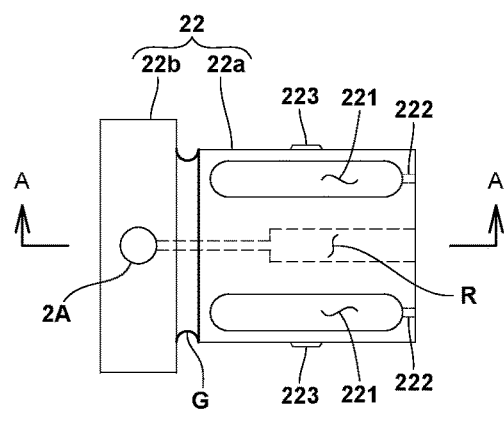
FIG. 8 is a plan view and a cross sectional view taken along the line A-A, illustrating a configuration of a cell cap according to another embodiment.
Figure 8:
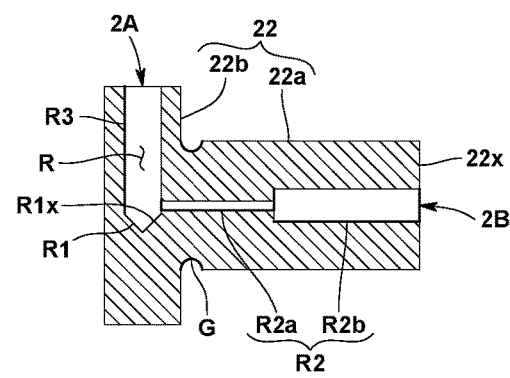

In the measurement cell 2 according another embodiment, as illustrated in FIG. 8, a recess (specifically, a groove) G may be provided across the side surfaces of the inserted portion 22$a$ of the cell cap 22 so as to prevent leakage of the density gradient liquid $W_{DGS}$ oozing out of the gap between the cell main body 21 and the cell cap 22, due to the capillary phenomenon. The recess G preferably has an annular shape in a manner extending around the side surfaces of the inserted portion 22$a$, about its axis. By providing such a recess G across the side surface of the inserted portion 22$a$ and increasing the gap with respect to the main body 21, it is possible to stop oozing of the density gradient liquid $W_{DGS}$ due to the capillary phenomenon.

In addition, various modifications and combinations of the embodiments may be made within the scope not deviating from the gist of the present invention.

INDUSTRIAL APPLICABILITY

According to the present invention, it is possible to improve the measurement accuracy of a particle size distribution measuring device that performs particle size distribution measurement in a line start mode.

The invention claimed is:

1. A measurement cell used in a line start mode of a centrifugal sedimentation type particle size distribution measuring device, the measurement cell comprising:
   a cell main body that has an opening on one end and that stores therein a density gradient liquid that is a solution having a density gradient;
   a cell cap that closes the opening of the cell main body and that is provided with an internal passage for holding a sample liquid, wherein
   the sample liquid held in the internal passage of the cell cap is introduced into the density gradient liquid in the cell body through the internal passage by receiving an application of a centrifugal force.

2. The measurement cell according to claim 1, wherein the internal passage has a sample inlet provided on one end and a sample outlet provided on another end, and with the cell cap attached to the cell main body, the sample inlet is positioned external of the cell main body and the sample output is positioned internal of the cell main body.

3. The measurement cell according to claim 2, wherein the internal passage includes a liquid reservoir that holds the sample liquid introduced from the sample inlet, and a main passage communicating with the liquid reservoir and communicating with the sample outlet, and when an application of a centrifugal force is received, the sample liquid held in the liquid reservoir flows into the main passage, passes through the main passage, and is introduced into the density gradient liquid.

4. The measurement cell according to claim 3, wherein the main passage includes a small diameter passage portion communicating with the liquid reservoir, and a large diameter passage portion provided downstream of the small diameter passage portion and communicating with the sample outlet.

5. The measurement cell according to claim 3, wherein
the internal passage further includes an inlet passage portion that communicates with the sample inlet and the liquid reservoir, and
the inlet passage portion is provided along a direction of a rotating shaft of the measurement cell, and
the main passage is provided along a direction of a centrifugal force applied to the measurement cell.

6. The measurement cell according to claim 3, wherein
the main passage is connected to an upper part of the liquid reservoir, and
the liquid reservoir has an inclined surface inclined upward toward the main passage on a side connected with the main passage.

7. The measurement cell according to claim 6, wherein the liquid reservoir has a conical shape or a partial conical shape tapered toward a bottom.

8. The measurement cell according to claim 1, wherein, when the cell cap is attached to the cell main body, a space is ensured between the cell cap and the density gradient liquid.

9. The measurement cell according to claim 1, wherein the cell main body and the cell cap are provided with a restricting mechanism that restricts an orientation in which the cell cap is attached to the cell main body.

10. A centrifugal sedimentation type particle size distribution measuring device comprising:
the measurement cell according to claim 1; and
a cell rotating mechanism that rotates the measurement cell in such a manner that a centrifugal force in a direction from a low density side toward a high density side of the density gradient is exerted on the measurement cell.

11. The centrifugal sedimentation type particle size distribution measuring device according to claim 10, wherein
the cell rotating mechanism includes a cell holder to which the measurement cell is attached,
the measurement cell is configured to be removable from the cell holder, and
the measurement cell and the cell holder are provided with a restricting mechanism that restricts an orientation in which the measurement cell is attached to the cell holder.

12. The measurement cell according to claim 3, wherein
the internal passage further includes an inlet passage portion that communicates with the sample inlet and the liquid reservoir,
the main passage is provided along a longitudinal direction of the measurement cell, and
the inlet passage portion is provided along a direction inclined with respect to the main passage.

13. The measurement cell according to claim 3, wherein
the internal passage further includes an inlet passage portion that communicates with the sample inlet and the liquid reservoir,
the main passage is provided along a longitudinal direction of the measurement cell, and
the inlet passage portion is provided along a direction orthogonal with respect to the main passage.

* * * * *